United States Patent
Kim et al.

(10) Patent No.: US 9,929,832 B2
(45) Date of Patent: Mar. 27, 2018

(54) METHOD AND APPARATUS FOR TRANSMITTING AND RECEIVING STATUS REPORT IN A MOBILE COMMUNICATION SYSTEM

(75) Inventors: Soeng-Hun Kim, Suwon-si (KR); Gert-Jan Van Lieshout, Staines (GB); Himke Van Der Velde, Staines (GB)

(73) Assignee: Samsung Electronics Co., Ltd (KR)

( * ) Notice: Subject to any disclaimer, the term of this patent is extended or adjusted under 35 U.S.C. 154(b) by 1918 days.

(21) Appl. No.: 11/787,425

(22) Filed: Apr. 16, 2007

(65) Prior Publication Data
US 2007/0283032 A1 Dec. 6, 2007

(30) Foreign Application Priority Data
Apr. 14, 2006 (KR) .................. 33964-2006

(51) Int. Cl.
H04L 1/16 (2006.01)
H04L 1/08 (2006.01)
H04L 1/18 (2006.01)

(52) U.S. Cl.
CPC .................. *H04L 1/18* (2013.01); *H04L 1/08* (2013.01); *H04L 1/1685* (2013.01)

(58) Field of Classification Search
CPC ....... H04L 1/18; H04L 1/1864; H04L 1/1896; H04L 1/1825; H04L 1/1607; H04L 1/1812
(Continued)

(56) References Cited

U.S. PATENT DOCUMENTS 6,697,988 B2 2/2004 Kim et al.
6,947,394 B1 9/2005 Johansson et al.
(Continued)

FOREIGN PATENT DOCUMENTS

EP 1 263 159 12/2002
EP 1 286 491 2/2003
(Continued)

OTHER PUBLICATIONS

Fairhurst, G et al, Best Current Practice (RFC3366), Aug. 2002, pp. 1-12, retrieved from internet on Jan. 7, 2015, https://www.rfc-editor.org/rfc/pdfrfc/rfc3366.txt.pdf.*
(Continued)

*Primary Examiner* — Tom Y Chang
(74) *Attorney, Agent, or Firm* — The Farrell Law Firm, P.C.

(57) ABSTRACT

A method and apparatus for transmitting/receiving a status report in a mobile communication system where Automatic Repeat reQuest (ARQ) and Hybrid Automatic Repeat reQuest (HARQ) operate together. An ARQ receiving (Rx) entity determines whether transmission of the status report is permitted, if a predetermined status report generation condition is satisfied. If the transmission of the status report is permitted, the ARQ Rx entity generates a status report depending on a reception status of ARQ packets received up to the time the transmission of the status report is permitted, and transmits the generated status report to an ARQ transmitting (Tx) entity through an allocated transmission resource. The ARQ Tx entity determines an initial reception time of an HARQ packet including the status report as a generation time of the status report, and performs retransmission according to the status report.

10 Claims, 7 Drawing Sheets

(58) Field of Classification Search
USPC .......................................... 709/228, 227, 232
See application file for complete search history.

(56) References Cited

U.S. PATENT DOCUMENTS

| | | |
|---|---|---|
| 7,058,027 B1 * | 6/2006 | Alessi et al. ............... 370/310.1 |
| 2002/0093937 A1 | 7/2002 | Kim et al. |
| 2002/0114379 A1 * | 8/2002 | Uesugi et al. ................ 375/219 |
| 2003/0191844 A1 * | 10/2003 | Meyer et al. ................ 709/227 |
| 2005/0094632 A1 * | 5/2005 | Hebsgaard et al. .......... 370/389 |
| 2006/0156162 A1 * | 7/2006 | Choi et al. .................... 714/748 |

FOREIGN PATENT DOCUMENTS

| | | |
|---|---|---|
| KR | 1020010064867 | 7/2001 |
| KR | 1020020003233 | 1/2002 |
| WO | WO 2004/091129 | 10/2004 |

OTHER PUBLICATIONS

ZTE, "Distributed Feedback for ARQ Operation", 3GPP TSG RAN WG2 #52, Mar. 27, 2006, R2-060843.
Ericsson, "Outer ARQ and HARQ", 3GPP TSG-RAN WG2 #52, Mar. 27, 2006, R2-060971.

* cited by examiner

METHOD AND APPARATUS FOR TRANSMITTING AND RECEIVING STATUS REPORT IN A MOBILE COMMUNICATION SYSTEM

PRIORITY

This application claims priority under 35 U.S.C. § 119(a) to a Korean Patent Application filed in the Korean Intellectual Property Office on Apr. 14, 2006, entitled "Method and Apparatus for Transmitting and Receiving Status Report in a Mobile Communication System" and assigned Serial No. 2006-33964, the disclosure of which is incorporated herein by reference.

BACKGROUND OF THE INVENTION

1. Field of the Invention

The present invention relates generally to a mobile communication system, and in particular, to a method and apparatus for transmitting and receiving a status report of Automatic Repeat reQuest (ARQ) in an ARQ layer.

2. Description of the Related Art

The Universal Mobile Telecommunication Service (UMTS) system, which is a $3^{rd}$ Generation (3G) asynchronous mobile communication system, uses Wideband Code Division Multiple Access (WCDMA). UMTS is based on Global System for Mobile Communications (GSM) and General Packet Radio Services (GPRS), both of which are European mobile communication systems.

Within the $3^{rd}$ Generation Partnership Project (3GPP) in charge of UMTS standardization, Long Term Evolution (LTE) is being discussed as the next generation mobile communication system of the UMTS system. LTE, aimed for deployment in around 2010, is a technology for implementing high-speed packet based communication at about 100 Mbps. To this end, several schemes are under discussion, including one scheme for reducing the number of nodes located in a communication path by simplifying the network configuration, and another scheme for maximally implementing wireless protocols to wireless channels.

FIG. 1 is an overview of a configuration of an Evolved UMTS (E-UMTS) mobile communication system.

Referring to FIG. 1, a configuration of Evolved UMTS Radio Access Networks (E-UTRANs or E-RAN) 135 and 140 is simplified to a 2-node configuration of Evolved Node Bs (ENBs or Node Bs) 110 to 130, and anchor nodes 145 and 150. A User Equipment (UE) 105 accesses an Internet Protocol (IP) network by E-RAN 135 and 140.

ENBs 110 to 130, nodes corresponding to the existing Node Bs, are connected to UE 105 over a wireless channel. Compared with the existing Node Bs, ENBs 110 to 130 perform more complex functions.

In LTE, all user traffics, including real-time services such as Voice over IP (VoIP) service, are serviced over a shared channel. This means that there is a need for an apparatus for collecting status information of UEs and performing scheduling depending thereon, and the scheduling is managed by ENBs 110 to 130. The terms 'ENB' and 'Node B' are herein used interchangeably.

In LTE, like in High Speed Downlink Packet Access (HSDPA) or Enhanced Uplink Dedicated Channel (EDCH), Hybrid Automatic Repeat reQuest (HARQ) is performed between ENBs 110 to 130 and UE 105. However, with use of only the HARQ, LTE cannot satisfy the various Quality of Service (QoS) requirements. Therefore, a separate ARQ (or outer-ARQ) can be performed in an upper layer, and outer-ARQ is also performed between ENBs 110 to 130 and UE 105.

It is expected that LTE will use Orthogonal Frequency Division Multiplexing (OFDM) as wireless access technology in a 20-MHz bandwidth in order to realize a data rate of a maximum of 100 Mbps. In addition, LTE will employ Adaptive Modulation & Coding (AMC) that determines a modulation scheme and a channel coding rate according to channel status of UEs. Many mobile communication systems now under discussion, including LTE, use both HARQ and ARQ as an error correction technique.

HARQ is a technique for soft-combining previously received data with retransmitted data without discarding the previously received data, thereby increasing the reception success rate. More specifically, an HARQ receiving (Rx) entity determines presence/absence of error in a received packet, and sends an Acknowledged (ACK) signal or a Non-Acknowledged (NACK) signal to an HARQ transmitting (Tx) entity according to the presence/absence of error. The HARQ Tx entity performs retransmission of the HARQ packet or transmission of a new HARQ packet according to the HARQ ACK/NACK signal. HARQ is characterized in that it soft-combines a retransmitted packet with a previously received packet, thereby reducing the error rate.

However, ARQ, a technique for checking the sequence number of a received packet and sending the retransmission request for a missing packet using a status report, does not soft-combine a previously received packet with a retransmitted packet.

Because both ARQ and HARQ have a function of recovering erroneous packets, it is considered that there is no need to perform ARQ and HARQ together. However, because a sufficiently low packet error ratio cannot be obtained with only using HARQ, ARQ and HARQ should be performed together in most packet services.

In HARQ, because an HARQ ACK/NACK signal is a 1-bit response signal, it is difficult to reduce the error rate through channel coding. Therefore, it is hard to achieve a low packet error rate with use of only HARQ. That is, if an HARQ NACK signal is misrecognized as an HARQ ACK signal, the corresponding packet is completely lost at the HARQ layer. Therefore, reliability of the HARQ ACK/NACK signal acts as an important factor in determining a packet error ratio in the HARQ layer.

The system, in which ARQ and HARQ operate together, can increase efficiency of an ARQ operation using information from the HARQ layer. For example, an HARQ Tx entity sends transmission complete time information for an ARQ packet to an ARQ transmitting (Tx) entity, and the ARQ Tx entity compares the time the status report has occurred, with the time the ARQ packet transmission is completed, thereby preventing unnecessary retransmission.

If occurrence and transmission of the status report are achieved during the same time, the time the HARQ packet containing the status report was initially received is substantially equal to the time the status report has occurred. However, if the occurrence time of the status report is different from the transmission time of the status report, the ARQ Tx entity cannot estimate the occurrence time of the status report, and merely recognizes, as the occurrence time of the status report, the time the HARQ packet containing the status report was initially received.

For example, reception of success/failure information for specific ARQ packet(s), received for a delayed time from the occurrence time to the transmission time of the status report at the ARQ receiving (Rx) entity, cannot be included in the previously generated status report. Because the status report has no reception of success/failure information for the specific ARQ packet; the ARQ Tx entity retransmits the specific ARQ packet to the ARQ Rx entity, considering that it has failed to transmit the specific ARQ packet. Therefore, the conventional mobile communication system may experience unnecessary retransmission.

SUMMARY OF THE INVENTION

An aspect of the present invention is to address at least the above problems and/or disadvantages and to provide at least the advantages described below. Accordingly, an aspect of the present invention is to provide a method and apparatus in which an ARQ receiving (Rx) entity generates and sends a status report at the time when it can substantially send the status report in a mobile communication system.

Another aspect of the present invention is to provide a method and apparatus in which an ARQ transmitting (Tx) entity estimates the occurrence time of a status report after receiving the status report in a mobile communication system.

Another aspect of the present invention is to provide a method and apparatus in which the ARQ Tx entity estimates the time a status report has occurred in an HARQ layer, in a mobile communication system where ARQ and HARQ operate together.

Another aspect of the present invention is to provide a method and apparatus in which an ARQ Tx entity removes the time error due to a scheduling delay of an HARQ packet when it estimates the occurrence time of a status report at an initial reception time of the HARQ packet containing the status report in a mobile communication system where ARQ and HARQ operate together.

According to one aspect of the present invention, there is provided a method for transmitting the status report of an Automatic Repeat reQuest (ARQ) layer in a mobile communication system including the ARQ layer and a Hybrid Automatic Repeat reQuest (HARQ) layer. The transmission method includes determining by an ARQ receiving (Rx) entity whether transmission of the status report is permitted, when a predetermined status report generation condition is satisfied; if transmission of the status report is permitted, generating a status report depending on a reception status of ARQ packets up to the time the transmission of the status report is permitted; and transmitting the generated status report to an ARQ transmitting (Tx) entity through an allocated transmission resource.

According to another aspect of the present invention, there is provided a method for receiving the status report of an Automatic Repeat reQuest (ARQ) layer in a mobile communication system including the ARQ layer and a Hybrid Automatic Repeat reQuest (HARQ) layer. The reception method includes recording, by a transmitting HARQ transmitting/receiving (Tx/Rx) entity, the initial reception time of an HARQ packet, when the HARQ packet is initially received from an ARQ receiving (Rx) entity; if it is determined that the HARQ packet has been successfully received, detecting the status report contained in the HARQ packet, and sending the detected status report to an ARQ transmitting (Tx) entity together with the initial reception time of the HARQ packet; and recognizing, by the ARQ Tx entity, the initial reception time as a generation time of the status report, and retransmitting retransmission-requested ARQ packets according to the status report.

According to a further aspect of the present invention, there is provided an apparatus for transmitting a status report of an Automatic Repeat reQuest (ARQ) layer in a mobile communication system including the ARQ layer and a Hybrid Automatic Repeat reQuest (HARQ) layer. The transmission apparatus includes a status report generator for determining whether transmission of the status report is permitted, when a predetermined status report generation condition is satisfied in an ARQ receiving (Rx) entity, and if transmission of the status report is permitted, generating a status report depending on the reception status of ARQ packets up to the time the transmission of the status report is permitted; and a transmitting entity for transmitting the generated status report to an ARQ transmitting (Tx) entity through an allocated transmission resource.

According to yet another aspect of the present invention, there is provided an apparatus for receiving a status report of an Automatic Repeat reQuest (ARQ) layer in a mobile communication system including the ARQ layer and a Hybrid Automatic Repeat reQuest (HARQ) layer. The reception apparatus includes an HARQ transmitting/receiving (Tx/Rx) entity for recording the initial reception time of the HARQ packet, when an HARQ packet is initially received from an ARQ receiving (Rx) entity, and if it is determined that the HARQ packet has been successfully received, detecting the status report contained in the HARQ packet, and outputting the detected status report together with the initial reception time of the HARQ packet; and an ARQ transmitting (Tx) entity for recognizing the initial reception time as a generation time of the status report, and retransmitting retransmission-requested ARQ packets according to the status report.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, detailed description of known functions and configurations has been omitted for clarity and conciseness.

The present invention provides a scheme in which an ARQ transmitting entity removes an error due to the scheduling delay of a status report when it estimates the time the status report has occurred in an HARQ layer in a mobile communication system where ARQ and HARQ operate together.

Figure 1:
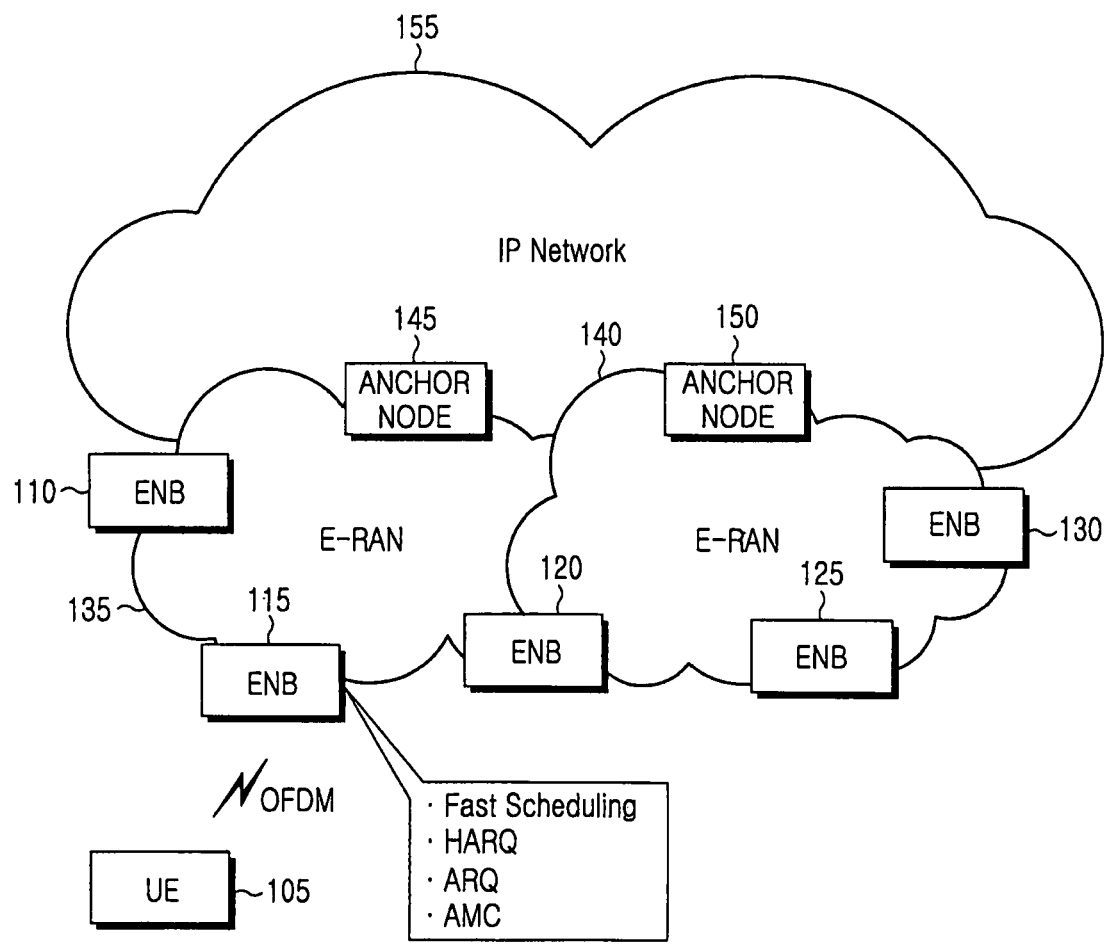
FIG. 1 is an overview of a configuration of an Evolved UMTS mobile communication system.
Figure 2:
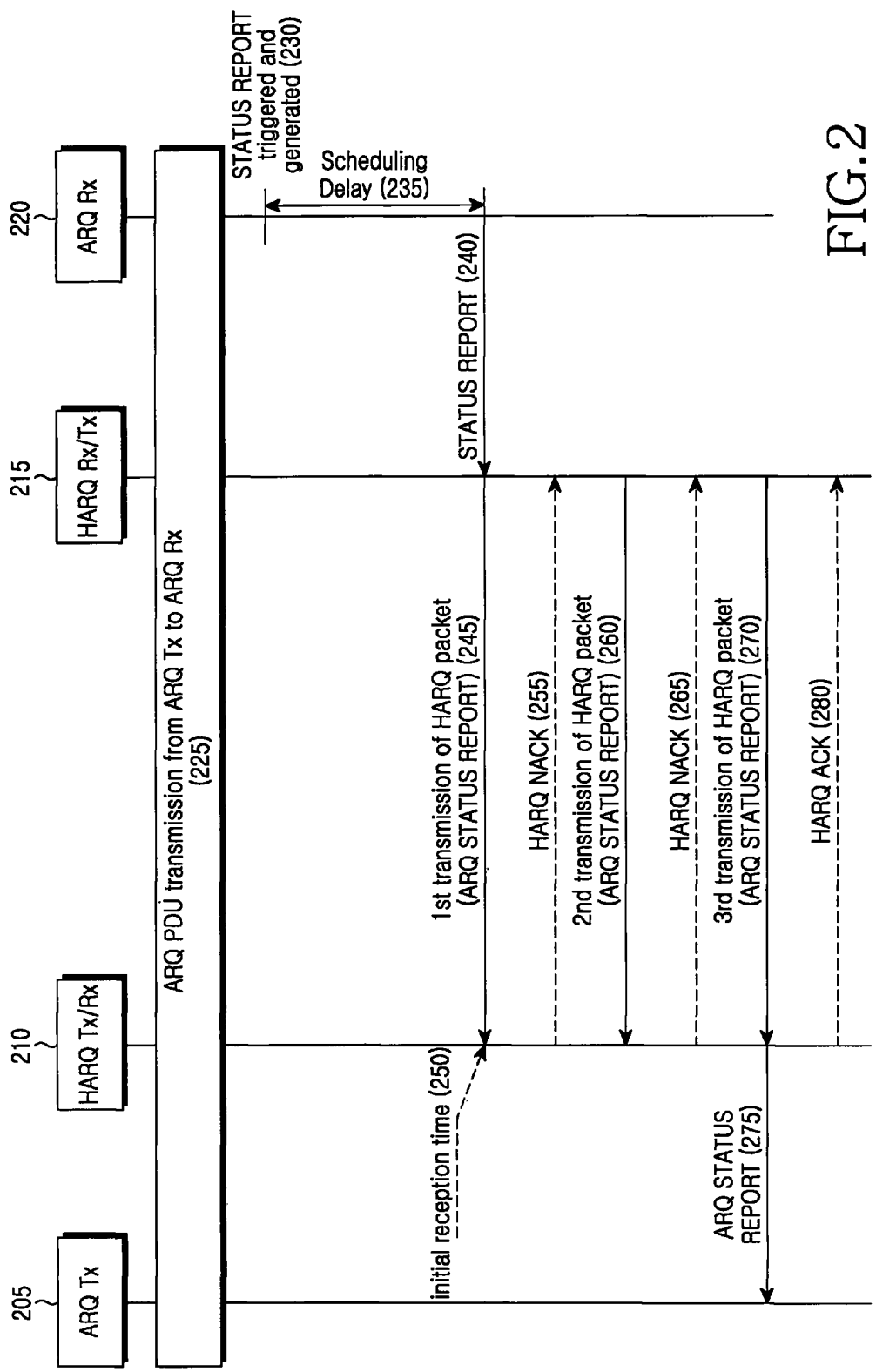
FIG. 2 is a flow diagram illustrating a status report transmission procedure in a general mobile communication system.

Referring to FIG. 2, the illustrated status report transmission procedure includes a scheduling delay. An ARQ transmitting (Tx) entity 205 transmits in step 225 an ARQ packet(s) to an ARQ receiving (Rx) entity 220 via HARQ transmitting/receiving (Tx/Rx) entities 210 and 215. In 3GPP, the term 'Protocol Data Unit (PDU)' is generally used instead of the term 'packet'. Thus, in the present invention, the terms 'packet' and 'PDU' will be used together. In step 230, if any one of predetermined status report generation conditions is satisfied, ARQ Rx entity 220 triggers the generation of a status report, and then sends the status report to ARQ Tx entity 205, to request retransmission of missing (or reception-failed) ARQ PDUs and/or to notify of successfully received ARQ PDUs.

The conditions on which ARQ Rx entity 220 generates a status report can be defined in a call setup process, and the conditions can include the following conditions.

ARQ Rx entity 220 generates a status report upon detecting a missing ARQ PDU.

ARQ Rx entity 220 generates a status report at stated periods.

If any one of the status report generation conditions is satisfied, ARQ Rx entity 220 triggers generation of a status report.

Preferably, the status report is sent upon its generation. However, in a communication system to which ENB scheduling is applied, like in LTE, there is a high possibility that a scheduling delay 235 will be applied. For example, if a UE including ARQ Rx entity 220 has no allocated transmission resource at time 230 the status report is generated, the UE should first go through a scheduling process of issuing a request for transmission resource and receiving allocated transmission resource, and scheduling delay 235 of a minimum of several tens of msec may be required in the scheduling process.

After ARQ Rx entity 220 experiences scheduling delay 235, the status report is contained in an HARQ packet in step 240, and then finally sent to HARQ Tx/Rx entity 210, a lower layer of the ARQ Tx entity 205, by HARQ Tx/Rx entity 215.

In the following description, it is assumed that an HARQ packet containing the status report succeeds in reception to ARQ Tx entity 205 through 3 repeated transmissions, by way of example.

That is, if ARQ Rx entity 220 sends the status report to receiving HARQ Tx/Rx entity 215 (i.e. HARQ Tx/Rx entity in the receiving entity) in step 240, receiving HARQ Tx/Rx entity 215 contains the status report in an HARQ packet and sends the HARQ packet to transmitting HARQ Tx/Rx entity 210 (i.e. HARQ Tx/Rx entity in the transmitting entity) in step 245 ($1^{st}$ Transmission). Transmitting HARQ Tx/Rx entity 210 checks in step 250 an initial reception time at which it has initially received the HARQ packet, and determines whether the HARQ packet has been successfully received without error. If it is determined that transmitting HARQ Tx/Rx entity 210 has failed in the successful reception of the HARQ packet, transmitting HARQ Tx/Rx entity 210 sends in step 255 a NACK to receiving HARQ Tx/Rx entity 215, and in response to the NACK, receiving HARQ Tx/Rx entity 215 retransmits in step 260 the HARQ packet to transmitting HARQ Tx/Rx entity 210 ($2^{nd}$ Transmission). Transmitting HARQ Tx/Rx entity 210 combines the second-transmitted HARQ packet with the first-transmitted HARQ packet, and then determines whether the HARQ packet has been successfully received.

If transmitting HARQ Tx/Rx entity 210 has failed again in the successful reception of the HARQ packet, transmitting HARQ Tx/Rx entity 210 sends again a NACK to the receiving HARQ Tx/Rx entity 215 in step 265. In response to the NACK, the receiving HARQ Tx/Rx entity 215 retransmits again the HARQ packet to transmitting HARQ Tx/Rx entity 210 in step 270 ($3^{rd}$ Transmission). If transmitting HARQ Tx/Rx entity 210 has now succeeded in reception of the HARQ packet, transmitting HARQ Tx/Rx entity 210 extracts a status report contained in the HARQ packet and sends the extracted status report to the ARQ Tx entity 205 in step 275, and then sends an ACK for the HARQ packet to the receiving HARQ Tx/Rx entity 215 in step 280.

ARQ Tx entity 205 prevents unnecessary retransmission of an ARQ PDU by recognizing the status report generation time 230 at which the status report is generated. As for status report generation time 230, it is explicitly expressed in the status report, or HARQ Tx entity 205 estimates status report generation time 230 using initial reception time 250 of the HARQ packet containing the status report. However, the method of using initial reception time 250 of the HARQ packet is inaccurate as scheduling delay 235 applied to the status report is disregarded.

Therefore, the preferred embodiment of the present invention removes the error due to the scheduling delay applied to a status report, when estimating the status report generation time from the initial reception time of an HARQ packet containing the status report. That is, even though the status report generation condition is satisfied, the ARQ Rx entity does not immediately generate the status report, but generates a status report after preparing for its transmission, like allocation of transmission resource, is completed. In addition, the ARQ Tx entity recognizes, as a status report generation time, an initial reception time of an HARQ packet containing a status report.

Figure 3:
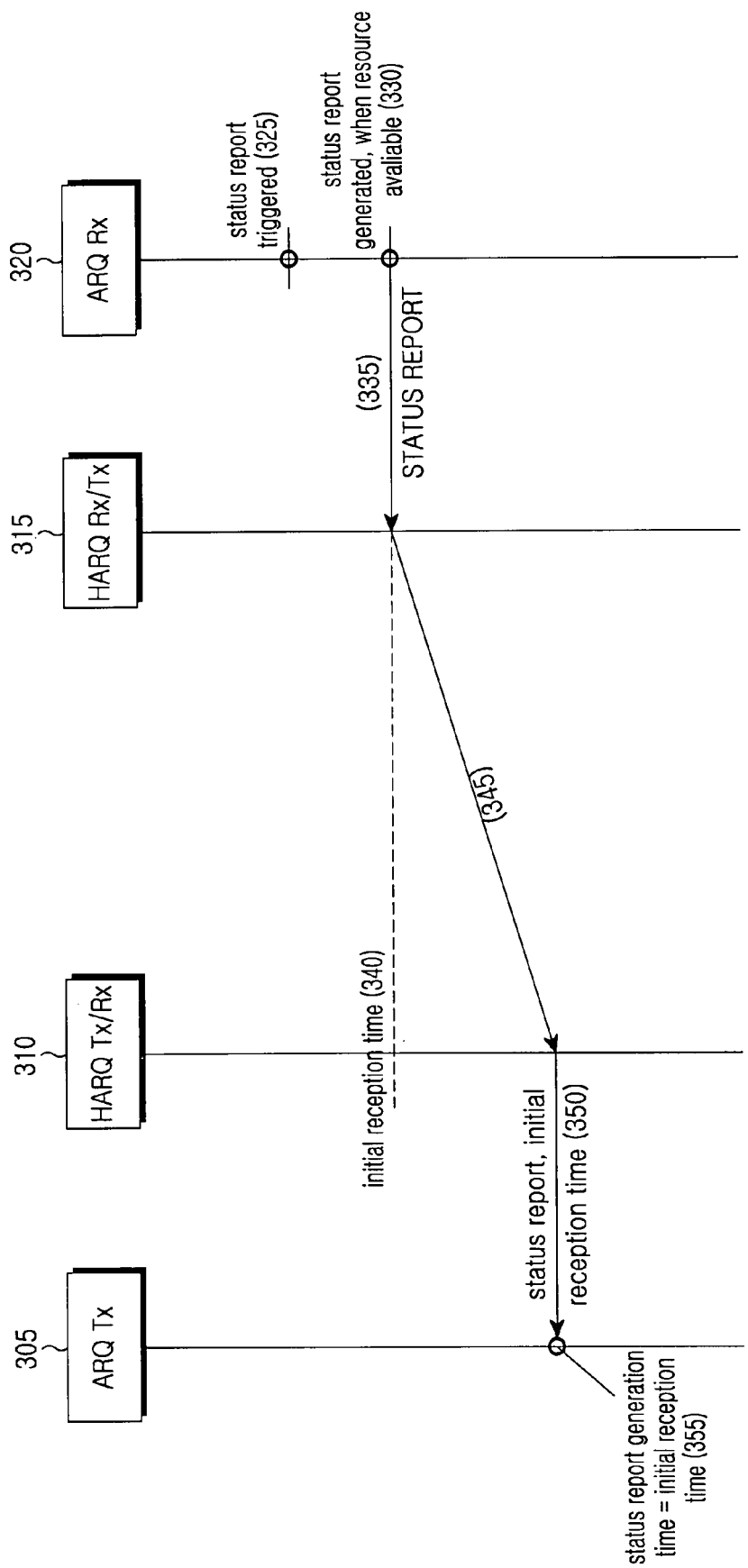
FIG. 3 is a flow diagram illustrating a status report transmission procedure according to the present invention.

Referring to FIG. 3, the status report is triggered in step 325, if one of status report generation conditions is satisfied in ARQ Rx entity 320. The status report generation condition can be periodical generation of a status report, or discovery of a missing ARQ PDU. Even though the status report is triggered, ARQ Rx entity 320 performs the following operation without immediately generating a status report.

That is, ARQ Rx entity 320 reports presence of transmission data to a lower layer (not shown), and the lower layer permits ARQ Rx entity 320 to deliver the transmission data if there is any transmission resource actually allocated. For example, the lower layer, an entity in charge of management of transmission resources, is a scheduler in an ENB, and is a transmission resource manager in the UE. If there is no transmission resource allocated at the present time at which ARQ Rx entity 320 reports presence of transmission data, the lower layer is allocated a transmission resource through an appropriate process. If ARQ Rx entity 320 belongs to a UE, the lower layer sends an allocation request for transmission resource to an ENB, and waits until transmission resource is allocated from the ENB. If transmission resource is allocated, the lower layer permits ARQ Rx entity 320 to deliver the transmission data.

Upon acquiring transmission approval from the lower layer, ARQ Rx entity 320 generates a status report in step 330. The status report contains sequence numbers of missing ARQ PDUs for retransmission request, and sequence numbers of ARQ PDUs successfully received up to the time the status report is generated. The missing ARQ PDU refers to a reception-failed (or NACK-ed) ARQ PDU, and the ARQ PDU, reception of which is unknown, does not correspond to the missing ARQ PDU.

ARQ Rx entity 320 sends the status report to a receiving HARQ Tx/Rx entity 315 in step 335, and receiving HARQ Tx/Rx entity 315 generates an HARQ packet containing the status report and then transmits the HARQ packet to a transmitting HARQ Tx/Rx entity 310 using an allocated transmission resource in step 345.

Transmitting HARQ Tx/Rx entity 310 records an initial reception time 340 of the HARQ packet, and determines if the HARQ packet has been successfully received. If the HARQ packet has been successfully received, transmitting HARQ Tx/Rx entity 310 sends in step 350 initial reception time 340 of the HARQ packet to an ARQ Tx entity 305 together with the status report contained in the HARQ packet.

In step 355, ARQ Tx entity 305 recognizes, as the status report generation time, initial reception time 340 transmitted in step 350 together with the status report. If there is an ARQ PDU, which was transmitted before the status report generation time but has not been ACK-ed yet by the status report, ARQ Tx entity 305 determines that the ARQ PDU needs retransmission.

Figure 4:
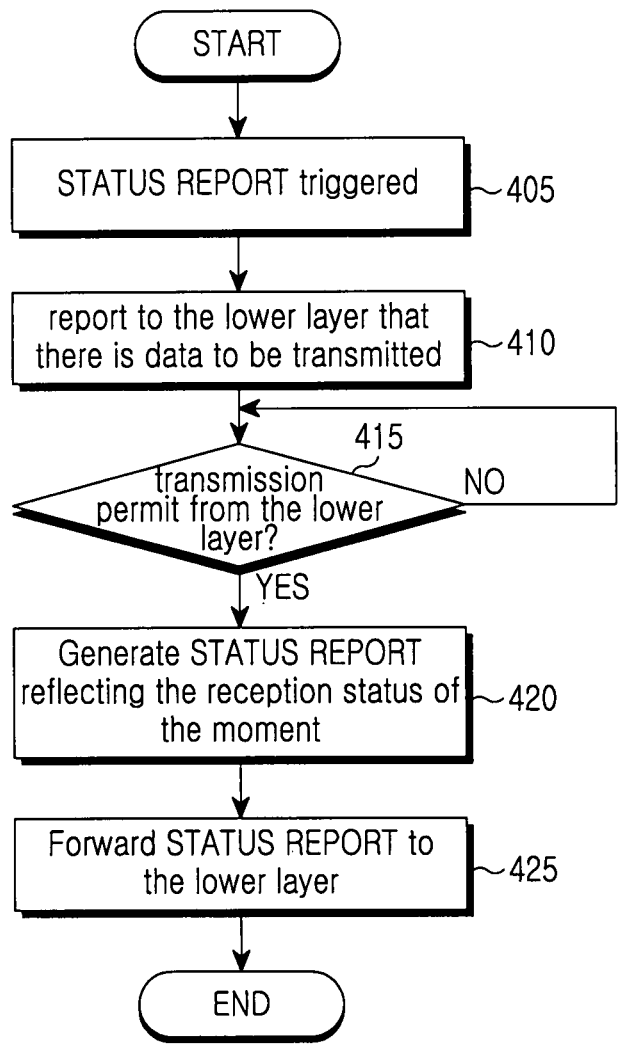
FIG. 4 is a flowchart of a generation and transmission process of a status report in an ARQ Rx entity according to the present invention.

Referring to FIG. 4, a status report generation condition is satisfied and a generation of the status report is triggered in step 405, and then an ARQ Rx entity reports in step 410 the presence of transmission data to a lower layer in charge of management of transmission resources. The transmission data includes a status report to be transmitted. If the lower layer permits data transmission in step 415 by allocating transmission resource to be used for transmission of data including a status report, ARQ Rx entity proceeds to step 420, and if data transmission is not permitted, the ARQ Rx entity waits until the data transmission is permitted. For example, if a UE including the ARQ Rx entity is scheduled in the current transmission time interval, or if an ENB including the ARQ Rx entity has scheduled a UE that will transmit the status report, the ARQ Rx entity determines that transmission of data including the status report is possible.

In step 420, the ARQ Rx entity generates a status report depending on the ARQ PDU reception status up to the present time. The status report contains sequence numbers of ARQ PDUs successfully received up to the present time, i.e. ACK-ed ARQ PDUs, and sequence numbers of ARQ PDUs reception-failed up to the present time, i.e. NACK-ed ARQ PDUs, for which the status report is generated. Because the ARQ Rx entity cannot recognize the existence of the ARQ PDU that is in an HARQ procedure in its lower HARQ Tx/Rx entity or is completely lost in a delivery process, the ARQ Rx entity does not include a sequence number of the ARQ PDU in the status report. Thereafter, in step 425, the ARQ Rx entity forwards the status report to its lower HARQ Tx/Rx entity, and the HARQ Tx/Rx entity contains the status report in an HARQ packet and sends the HARQ packet to an ARQ Tx entity via a counterpart HARQ Tx/Rx entity.

To sum up, if the status report generation condition is satisfied, the ARQ Rx entity waits until the time it can actually send the status report, and generates a status report at the time it can send the status report. In this manner, the ARQ Rx entity maximally approaches the time the status report is generated, to the time the transmission of the status report is started. Therefore, the ARQ Tx entity can determine that the 'status report reception time' is substantially equal to the 'status report generation time'. The propagation delay may be taken into consideration between the time the HARQ packet including the status report is sent from the receiving HARQ Tx/Rx entity, and the time the HARQ packet is received at the transmitting HARQ Tx/Rx entity. However, this is not related to the present invention, so a detailed description thereof will be omitted.

Figure 5:
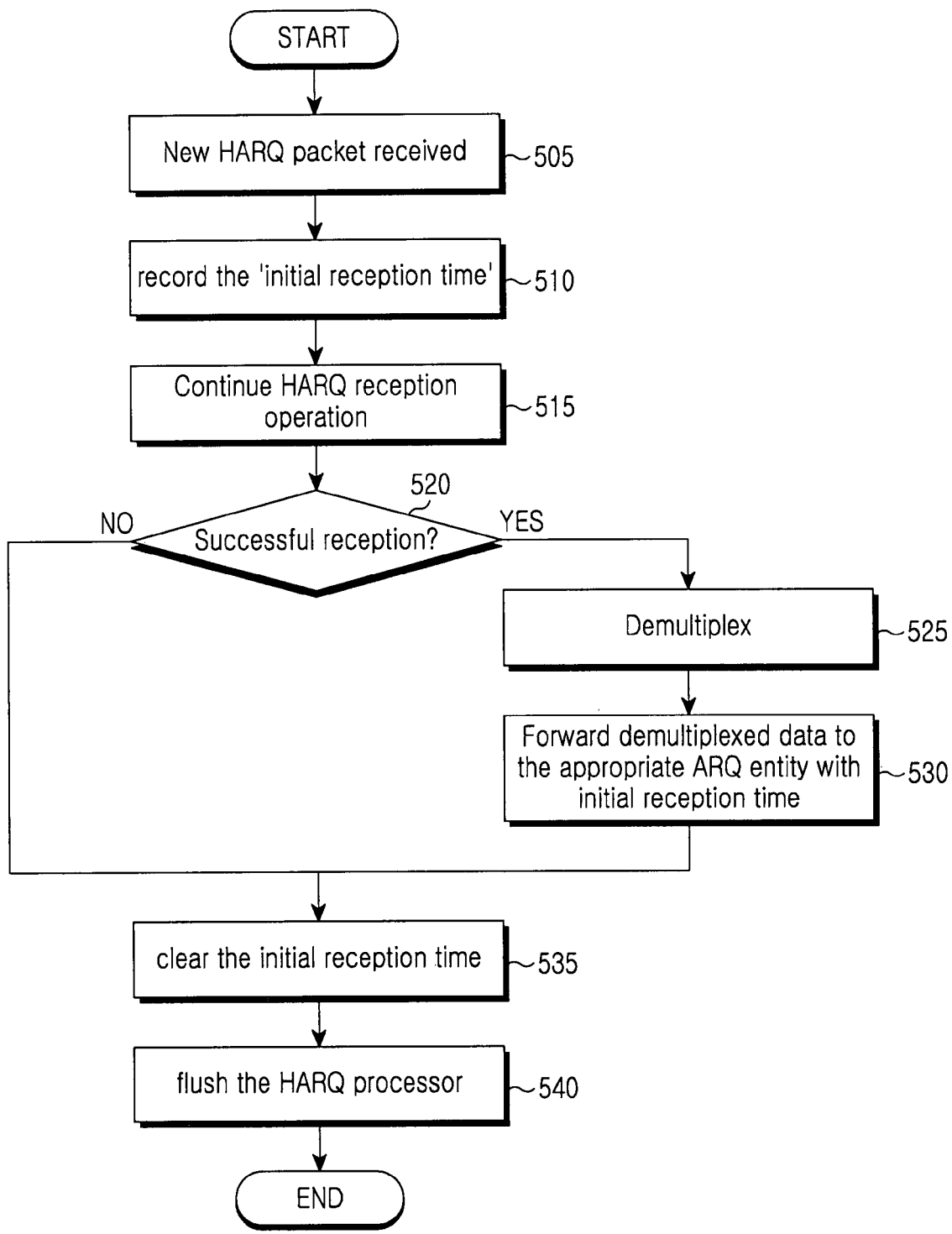
FIG. 5 is a flowchart of an operation of an HARQ Rx entity according to the present invention.

Referring to FIG. 5, a new HARQ packet is received in step 505, i.e. if the HARQ packet is initially received, and then a HARQ Tx/Rx entity records an initial reception time of the HARQ packet in step 510.

The HARQ Tx/Rx entity recognizes the reception of the new HARQ packet depending on the decoding control information of the HARQ packet, transmitted over a control channel, like Retransmission Sequence Number (RSN) or New Data Indicator (NDI). For example, if RSN is set to '0' or NDI is set to a different value from the previous value, it means that transmission of a new HARQ packet starts.

In step 515, the HARQ Tx/Rx entity performs an HARQ reception process on the HARQ packet. That is, the HARQ Tx/Rx entity determines presence/absence of error in the HARQ packet through Cyclic Redundancy Checking (CRC) on the HARQ packet. If there is a CRC error, the HARQ Tx/Rx entity stores the HARQ packet in a soft buffer of the corresponding HARQ processor, for soft combining. However, if there is no CRC error, the HARQ Tx/Rx entity processes and forwards the HARQ packet to its upper layer.

If reception of the HARQ packet is successful in step 520, i.e. there is no more error in the HARQ packet, the HARQ Tx/Rx entity proceeds to step 525 where it demultiplexes the upper layer data contained in the HARQ packet. Thereafter, in step 530, the HARQ Tx/Rx entity forwards the demultiplexed upper layer data to an appropriate upper layer. In particular, the status report in the demultiplexed upper layer data is sent to an ARQ Tx entity. At this point, the initial reception time of the HARQ packet, recorded in step 510, is sent to the ARQ Tx entity together. In step 535, the HARQ Tx/Rx entity clears the initial reception time recorded in step 510, and then proceeds to step 540 where it flushes the soft buffer of the HARQ processor.

If the reception of the HARQ packet has failed in step 520, i.e. if transmission of a new HARQ packet is started even though there is still an error in the HARQ packet, the HARQ Tx/Rx entity clears the initial reception time for the HARQ packet in step 535, and flushes the soft buffer of the HARQ processor in step 540.

Figure 6:
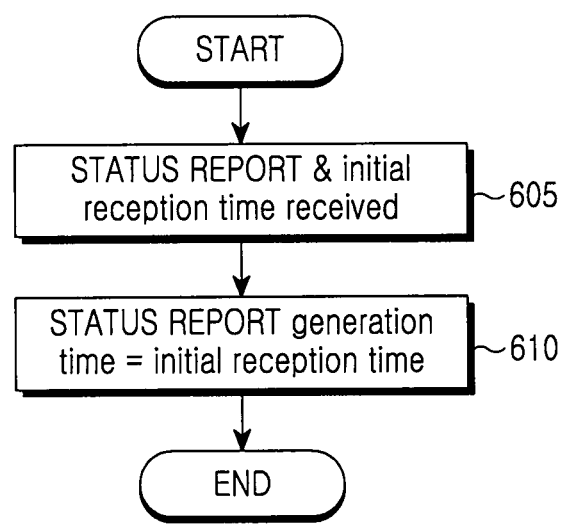
FIG. 6 is a flowchart of an operation of an ARQ Tx entity according to the present invention.

Referring to FIG. 6, if an ARQ Tx entity receives in step 605 a status report and an initial reception time from a transmitting HARQ Tx/Rx entity, which is its lower layer, the ARQ Tx entity recognizes in step 610 the initial reception time as a status report generation time, and performs the necessary operation according to the content of the status report. In other words, the ARQ Tx entity retransmits the missing ARQ PDUs indicated in the status report, and the ARQ PDU that was transmitted before the status report generation time but has not been ACK-ed by the status report.

The term 'time' used throughout the specification will now be described in more detail.

The present invention uses multiple segments of 'time' that should be equally recognized by a UE and an ENB, like 'status report generation time', 'initial reception time' and 'transmission complete time'. As the simplest way of allowing an index indicating a certain time to have the same meaning between two nodes, the UE and the ENB include timers synchronized with each other. However, in general mobile communication, it is more accepted that the UE uses the system time broadcasted by the ENB, rather than using the individual synchronized timers.

In mobile communication, a frame is used as a time unit. The frame means a period used as a basic unit for transmission/reception. For example, in UMTS, one-frame length is 10 msec.

In the conventional mobile communication system, like in UMTS, the ENB includes a timer (or counter) that increases by 1 at every frame boundary. The timer increases by 1 every 10 msec, and the timer starts at the initiation of the frame. An output value of the timer is increased by 1 at every frame boundary, and is called a frame number. As the ENB periodically broadcasts the frame number, the UE and the ENB can identify the frame number for a specific frame.

Therefore, the frame number broadcasted by the ENB can be used as the 'time' described in the present invention. For example, the status report generation time can be replaced with a frame number of the frame at which the status report is generated, and the transmission completion time can be replaced with a frame number of the transmission-completed frame. Specifically, the frame number be hierarchically structured. For example, in LTE, because the transmission/reception unit has a short period of 0.5 msec, the system uses a period longer than 10 msec as a unit of a frame rather than recognizing a frame in units of 0.5 msec, and can use 0.5 msec as a unit of a sub-frame. That is, in a system where one frame having a 10-msec length is composed of 20 sub-frames having a 0.5-msec length, the combination of a frame number and a sub-frame number can be used as an index of time. For example, the time 2505.11 means a sub-frame #11 in a frame #2505.

Figure 7:
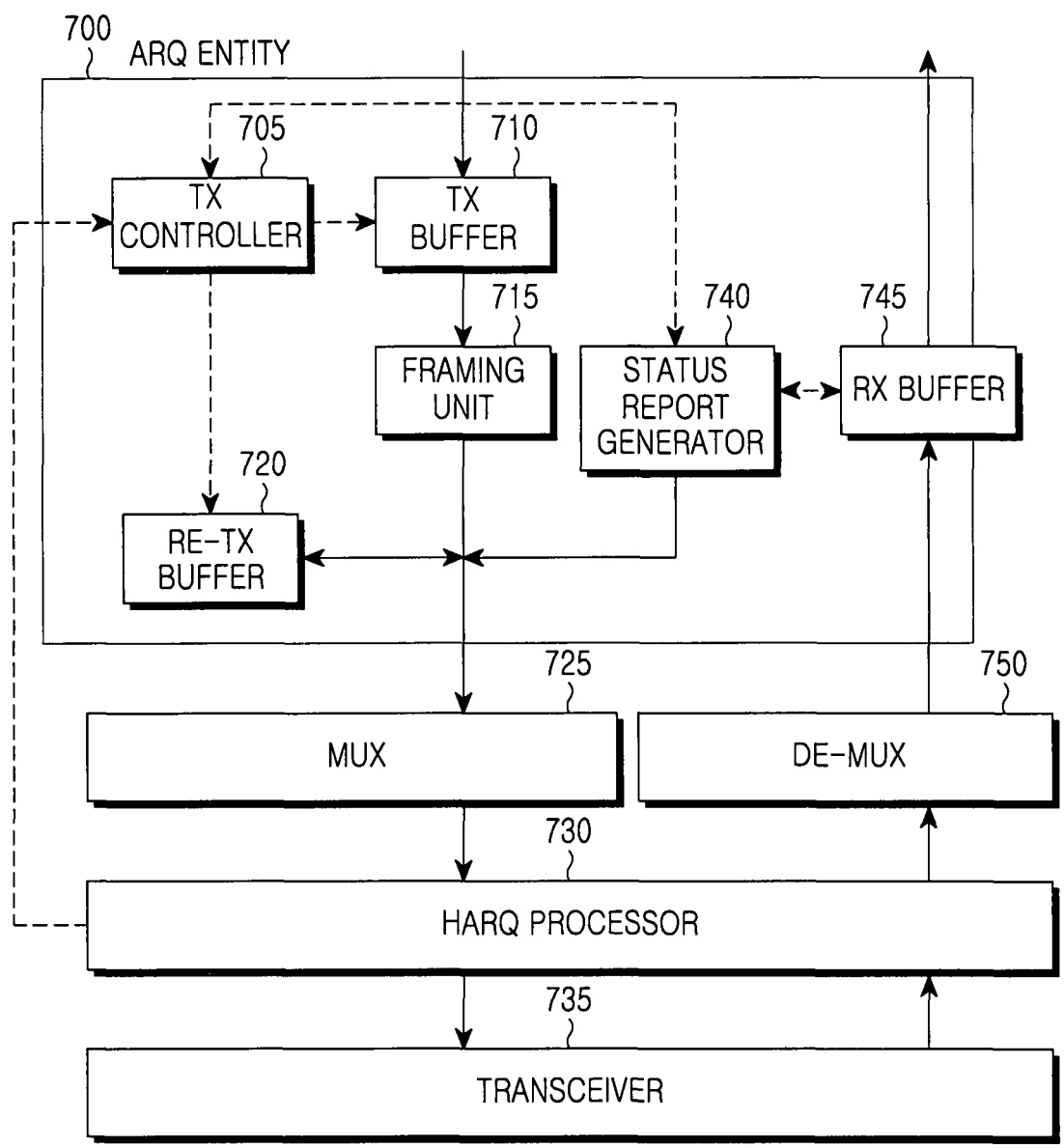
FIG. 7 is a block diagram illustrating a structure of an ARQ Tx/Rx entity according to the present invention.

As illustrated in FIG. 7, an ARQ entity 700 includes a transmission controller 705, a transmission buffer 710, a framing unit 715, a retransmission buffer 720, a status report generator 740, and a reception buffer 745. ARQ entity 700 is connected to a multiplexer 725 and a demultiplexer 750. Although only one ARQ entity 700 is shown herein, multiple undepicted ARQ entities can be provided. Multiplexer 725 multiplexes ARQ packets (i.e. ARQ PDUs) delivered from multiple ARQ entities 700 into one HARQ packet, and demultiplexer 750 demultiplexes an HARQ packet delivered from an HARQ processor 730 into multiple ARQ packets (i.e. ARQ PDUs), and delivers the ARQ packets to their associated ARQ entities.

HARQ processor 730 is a device for transmitting/receiving an HARQ packet through a specific HARQ operation, and a transceiver 735 is a device for modulating an HARQ packet into a radio signal before transmission, and demodulating a received radio signal. Demultiplexer 750 stores the received ARQ PDU in reception buffer 745.

Status report generator 740, if any one of predetermined status report generation conditions is satisfied, reports to transmission controller 705 that a status report is triggered. Thereafter, if transmission controller 705 permits transmission of a status report, status report generator 740 checks sequence numbers of the ARQ PDUs stored in reception buffer 745, recognizes sequence numbers of successfully received ARQ PDUs and sequence numbers of ARQ PDUs to be requested for retransmission, and generates a status report according thereto. Status report generator 740 sends the generated status report to counterpart node via the multiplexer 725.

A packet generated in the upper layer is stored in transmission buffer 710. The upper layer packet is framed in an appropriate size by framing unit 715, configured into an ARQ packet having header information including a sequence number inserted therein, and then delivered to multiplexer 725. A copy of the ARQ packet is stored in retransmission buffer 720.

Transmission controller 705 analyzes a trigger report on the status report delivered from status report generator 740, and controls data transmission of transmission buffer 710 and retransmission buffer 720 depending on the analysis result. Specifically, transmission controller 705 reports, to the lower layer, the amount of data stored in buffers 710 and 720, and based on the amount of data transmittable in the next transmission period, reported from the lower layer, transmission controller 705 determines data to be transmitted in the next transmission period, and controls buffers 710 and 720 to output appropriate data. The amount of transmittable data is determined according to the allocated transmission resource.

In particular, upon receipt of a trigger report for the status report from status report generator 740, transmission controller 705, if permission for data transmission is received from a lower layer, reports it to status report generator 740 so as to generate a status report. Therefore, in ARQ entity 700, at the time the data transmission is actually permitted, status report generator 740 generates a status report, and the status report is immediately sent using the allocated transmission resource.

In the mobile communication system to which ENB scheduling is applied, the present invention matches the time the status report is generated in the ARQ Rx entity, to the time the status report is actually transmitted, so that the ARQ Tx entity can find the time the status report is generated, from the initial reception time of an HARQ packet containing the status report, and can minimize inefficiency due to the incorrect status report.

As can be understood from the foregoing description, the ARQ Rx entity generates and sends a status report after a scheduling delay, and the ARQ Tx entity estimates, as a generation time of the status report, the initial reception time of an HARQ packet containing the status report, thereby preventing unnecessary retransmission due to an error between the status report generation time and the initial reception time.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. A method for transmitting a status report of an Automatic Repeat reQuest (ARQ) layer in a mobile communication system including the ARQ layer and a Hybrid Automatic Repeat reQuest (HARQ) layer, the method comprising:

determining, by an ARQ receiving (Rx) entity, whether a transmission opportunity of the status report is permitted by a lower layer, if a predetermined status report generation condition is satisfied, wherein the lower layer is lower than the ARQ layer and allocates resources to the ARQ Rx entity;

if the transmission opportunity of the status report is permitted by the lower layer, generating a status report depending on a reception status of ARQ packets received; and transmitting the generated status report to an ARQ transmitting (Tx) entity at the transmission opportunity of the status report.

2. The method of claim 1, wherein the status report includes sequence numbers of ARQ packets successfully received up to the time the transmission of the status report is permitted, and sequence numbers of ARQ packets reception-failed up to the time the transmission of the status report is permitted.

3. The method of claim 1, wherein the time the transmission opportunity of the status report is permitted by the lower layer, indicates a time at which the transmission resource used for transmitting data including the status report is allocated.

4. The method of claim 1, further comprising:
   determining that the status report generation condition is satisfied, if a present time reaches a transmission time interval based on a predetermined period.

5. The method of claim 1, further comprising:
   determining that the status report generation condition is satisfied, if a missing ARQ packet is detected in the course of receiving ARQ packets from the ARQ Tx entity.

6. An apparatus for transmitting a status report of an Automatic Repeat reQuest (ARQ) layer in a mobile communication system including the ARQ layer and a Hybrid Automatic Repeat reQuest (HARQ) layer, the apparatus comprising:
   a status report generator for, if a predetermined status report generation condition is satisfied in an ARQ receiving (Rx) entity, and if the transmission opportunity of the status report is permitted by the lower layer, generating a status report depending on a reception status of ARQ packets received, wherein the lower layer is lower than the ARQ layer and allocates resources to the ARQ Rx entity; and
   a status report transmitting entity for transmitting the generated status report to an ARQ transmitting (Tx) entity at the transmission opportunity of the status report.

7. The apparatus of claim 6, wherein the status report includes sequence numbers of ARQ packets successfully received up to the time the transmission of the status report is permitted, and sequence numbers of ARQ packets reception-failed up to the time the transmission of the status report is permitted.

8. The apparatus of claim 6, wherein the time the transmission opportunity of the status report is permitted by the lower layer, indicates the time at which a transmission resource used for transmitting data including the status report is allocated.

9. The apparatus of claim 6, wherein the status report generator determines that the status report generation condition is satisfied, if a present time reaches a transmission time interval based on a predetermined period.

10. The apparatus of claim 6, wherein the status report generator determines that the status report generation condition is satisfied, if a missing ARQ packet is detected in the course of receiving ARQ packets from the ARQ Tx entity.

* * * * *